UNITED STATES PATENT OFFICE.

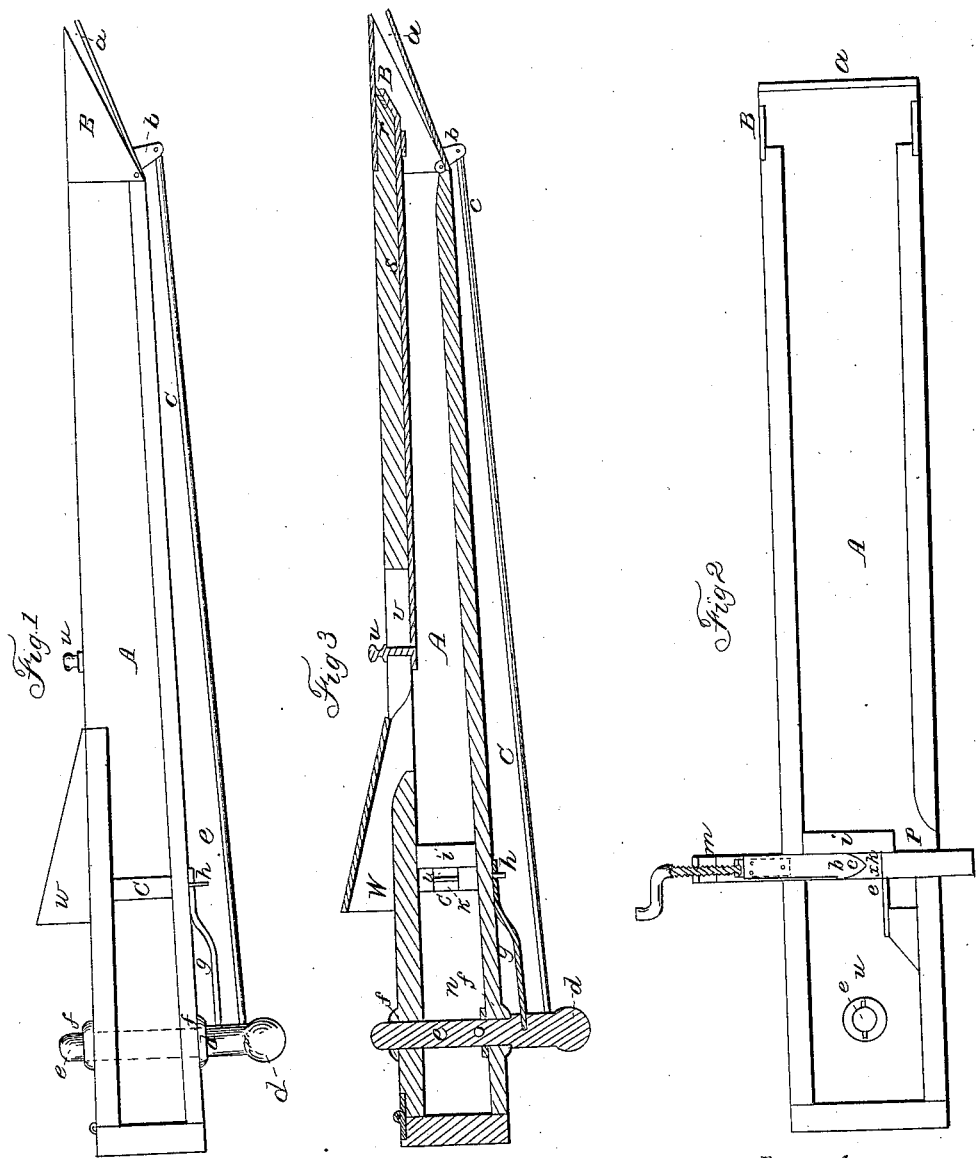

H. V. DAVIS, OF AMHERST, NEW HAMPSHIRE, ASSIGNOR TO DANIEL S. PERKINS, OF SAME PLACE.

IMPROVEMENT IN SEED-PLANTERS.

Specification forming part of Letters Patent No. 50,657, dated October 24, 1865.

*To all whom it may concern:*

Be it known that I, HERMAN V. DAVIS, of Amherst, in the county of Hillsborough and State of New Hampshire, have invented an Improved Seed-Planter; and I do hereby declare the same to be fully described in the following specification and represented in the accompanying drawings, of which—

Figure 1 is a side elevation; Fig. 2, a vertical section taken longitudinally through the charger. Fig. 3 is a vertical section taken transversely through such charger.

In the drawings, A denotes a tubular box provided at its lower end with a metallic wedge-shaped shoe, B, having a lid or door, a, applied by hinges to an opening in its side. To a short arm, b, extending from the lid or door a, in manner as shown in Fig. 3, a rod, c, at its lower end is jointed, the upper extremity of the rod being jointed to a handle, d, projecting from an arbor or spindle, e. The said arbor or spindle goes transversely through the upper part of the box A, and is supported in bearings f f, affixed thereto.

An arm, g, projects from the spindle and goes through a stud, h, which extends from the charger C, which is a slide arranged in the box A and on a partition, i, thereof, in manner as shown in the drawings.

By turning the handle and spindle in one direction the charger will be forced backward and the lid a will be simultaneously opened or drawn away from the shoe. During an opposite movement of the handle and the spindle the lid will be closed against the shoe, and the charger will be moved in an opposite direction to that in which it was before moved.

The charger has a long slot or passage, k, leading down through it, and being provided with a slide, l, which is furnished with an adjusting-screw, m, the same being for the purpose of forming a seed-receiving chamber, x, in the charger and determining the size of such chamber.

The space n over the charger may be termed the "hopper." Besides this there is a brush or elastic flap, o, arranged within the hopper and relatively to the charger in manner as shown in Figs. 1 and 3. There is a passage, p, between one end of the partition i and the side of the case A. Furthermore, a dirt-discharger, r, applied to a rod, s, is placed within the shoe, such rod, at its upper end, being provided with a knob or handle, u, which projects through and beyond a slot, v, made in one side of the case, the whole being arranged as shown in the drawings.

An auxiliary hopper or mouth, w, is applied to the case or box A and opens into that part of it which is below the partition i. This auxiliary mouth is for the reception of a fertilizing material, or whatever else it may be desirable at any time to plant with seed dropped from the charger.

In working with the said seed-planter an operative should apply his hand to the handle and turn it so as to cause the charger to be moved forward and the lid of the shoe to be closed. By this movement of the charger seed will be taken from the hopper n and discharged into and through the passage p, from whence such seed will drop down upon the inner surface of the said lid. Next, the operative should so press the machine into the ground as to cause the shoe to enter the same to the necessary depth for the planting of the seed, after which he should again turn the handle so as to cause a retreat of the charger and an opening of the lid, in which case the seed in the latter will be caused to fall out of the planter and more seed will be supplied to the charger.

In case dirt should get into the shoe so as to clog it or impede the operation of its lid, such dirt may be discharged from the shoe by means of the discharger r.

I claim as my invention—

1. The combination of the spindle e, handle d, the rods g c, the stud h, and the arm b, applied to the charger and the lid, whereby both charger and lid may be operated simultaneously by turning the handle, as specified.

2. The arrangement and combination of the auxiliary mouth or hopper w with the hand seed-planter, constructed substantially as described and for the purpose set forth.

HERMAN V. DAVIS.

Witnesses:
DAVID RUSSELL,
CHS. B. TUTTLE.